(12) United States Patent
Dietz, III et al.

(10) Patent No.: US 9,780,347 B2
(45) Date of Patent: Oct. 3, 2017

(54) ACID RESISTANT GLASS MATS THAT INCLUDE BINDERS WITH HYDROPHILIC AGENTS

(71) Applicant: JOHNS MANVILLE, Denver, CO (US)

(72) Inventors: Albert G Dietz, III, Littleton, CO (US); Zhihua Guo, Centennial, CO (US); Souvik Nandi, Highlands Ranch, CO (US); Gautam Sharma, Cleveland, TN (US)

(73) Assignee: Johns Manville, Denver, CO (US)

(*) Notice: Subject to any disclaimer, the term of this patent is extended or adjusted under 35 U.S.C. 154(b) by 18 days.

(21) Appl. No.: 14/641,940

(22) Filed: Mar. 9, 2015

(65) Prior Publication Data
US 2016/0268566 A1  Sep. 15, 2016

(51) Int. Cl.
| | |
|---|---|
| *H01M 2/16* | (2006.01) |
| *H01M 2/14* | (2006.01) |
| *B29C 70/88* | (2006.01) |
| *B29C 70/12* | (2006.01) |
| *B29C 70/36* | (2006.01) |
| *H01M 10/12* | (2006.01) |

(Continued)

(52) U.S. Cl.
CPC .......... *H01M 2/1613* (2013.01); *B29C 70/12* (2013.01); *B29C 70/36* (2013.01); *B29C 70/88* (2013.01); *D04H 1/4218* (2013.01); *H01M 2/145* (2013.01); *H01M 10/12* (2013.01); *B29K 2033/08* (2013.01); *B29K 2105/12* (2013.01); *B29K 2309/08* (2013.01); *B29K 2995/0058* (2013.01); *B29K 2995/0092* (2013.01); *B29L 2031/3468* (2013.01); *D10B 2401/022* (2013.01); *D10B 2505/02* (2013.01); *D10B 2505/04* (2013.01); *H01M 2220/20* (2013.01)

(58) Field of Classification Search
CPC combination set(s) only.
See application file for complete search history.

(56) References Cited

U.S. PATENT DOCUMENTS

| | | | |
|---|---|---|---|
| 2,978,529 A | | 4/1961 | Brisley et al. |
| 4,268,337 A | * | 5/1981 | Ibata .................. B32B 15/08 |
| | | | 156/244.17 |

(Continued)

FOREIGN PATENT DOCUMENTS

| | | |
|---|---|---|
| DE | 947 182 C | 8/1956 |
| EP | 0 381 077 A2 | 8/1990 |

(Continued)

*Primary Examiner* — Kaity Chandler
(74) *Attorney, Agent, or Firm* — Robert D. Touslee

(57) ABSTRACT

Glass-fiber mats for lead-acid batteries are described. The glass-fiber mats may include a plurality of glass fibers held together with a binder. The binder may be made from a binder composition that includes (i) an acid resistant polymer, and (ii) a hydrophilic agent. The hydrophilic agent increases the wettability of the glass-fiber mat such that the glass-fiber mat forms a contact angle with water or aqueous sulfuric acid solution of 70° or less. Also described are methods of making the glass-fiber mats that include applying a binder composition to the glass fibers, and including a hydrophilic agent in the glass fiber mat that increases the wettability of the mat. The hydrophilic agent may be added to the binder composition, applied to the glass-fiber mat, or both.

11 Claims, 4 Drawing Sheets

(51) Int. Cl.
*D04H 1/4218* (2012.01)
*B29K 33/00* (2006.01)
*B29K 105/12* (2006.01)
*B29K 309/08* (2006.01)
*B29L 31/34* (2006.01)

(56) References Cited

U.S. PATENT DOCUMENTS

| | | | |
|---|---|---|---|
| 4,440,838 A | 4/1984 | Schmidt | |
| 4,865,886 A * | 9/1989 | Itoh | D06M 14/14 427/342 |
| 5,376,477 A | 12/1994 | Aidman et al. | |
| 5,851,662 A * | 12/1998 | Suzuki | C08F 220/30 428/343 |
| 6,001,911 A * | 12/1999 | Ishizaki | A61F 13/531 521/141 |
| 6,406,813 B2 | 6/2002 | Rao | |
| 6,509,118 B1 | 1/2003 | Pavlov et al. | |
| 6,621,684 B2 * | 9/2003 | Shimamoto | H01G 9/038 252/62.2 |
| 6,680,144 B2 | 1/2004 | Choi | |
| 6,955,865 B2 | 10/2005 | Choi | |
| 7,132,195 B2 | 11/2006 | Hottori et al. | |
| 2001/0016288 A1 | 8/2001 | Clough | |
| 2002/0165291 A1 | 11/2002 | Choi | |
| 2003/0054236 A1 | 3/2003 | Zucker | |
| 2003/0149137 A1 * | 8/2003 | Tsukiyama | C08G 12/42 524/13 |
| 2003/0208831 A1 * | 11/2003 | Lazar | A41D 13/0053 2/69 |
| 2009/0011210 A1 * | 1/2009 | Gao | B29C 70/504 428/220 |
| 2010/0210745 A1 * | 8/2010 | McDaniel | C09D 5/008 521/55 |
| 2011/0040044 A1 * | 2/2011 | Motoyama | C08J 3/128 525/384 |
| 2011/0319547 A1 * | 12/2011 | Hashemzadeh | C08F 210/02 524/503 |
| 2012/0156954 A1 | 6/2012 | Eckert et al. | |
| 2015/0086838 A1 | 3/2015 | Guo et al. | |

FOREIGN PATENT DOCUMENTS

| | | |
|---|---|---|
| EP | 0 954 885 A1 | 11/1999 |
| EP | 1 444 742 A2 | 8/2004 |
| EP | 2 860 791 A1 | 4/2015 |
| GB | 580 390 A | 9/1946 |
| WO | 2009102946 A1 | 8/2009 |
| WO | 2010111491 A1 | 9/2010 |
| WO | 2015/021480 A1 | 2/2015 |

* cited by examiner

ACID RESISTANT GLASS MATS THAT INCLUDE BINDERS WITH HYDROPHILIC AGENTS

BACKGROUND OF THE INVENTION

Lead-acid batteries are an inexpensive, reliable, and rechargable storage medium for electric power. Their ability to provide a short burst of high current has made them the battery of choice to crank an automobile's starter motor for more than a century. Despite a long history of development and commericalization, and many well-studied shortcomings, the lead-acid battery is still being improved.

One area of continuing research is the materials used inside the battery. Most of them are exposed to the highly corrosive sulfuric acid that is used as the electrolyte in almost all lead-acid batteries. The materials used in the battery's positive and negative electrode assemblies, as well as the battery's separator, are expected to maintain their structural integrity for years in this corrosive environment. They should also be inexpensive and lightweight to keep the battery's costs down and energy-to-weight ratio up.

Glass fibers have become a popular choice for the separator and reinforcing mats found in lead-acid batteries. The glass fibers are relatively inert to the concentrated sulfuric acid used in the batteries, electrically insulating, and when properly arranged in a glass-fiber mat are sufficiently porous to allow the efficient migration of sulfate ions between the positive and negative electrodes. However, the glass fibers do not naturally stick together, and require a binder to hold them together in the mat. That binder needs to be resistant to the acidic environment just like the fibers themselves.

The binder compositions for glass fibers are typically organic compounds that form a polymer matrix around the fibers when cured. There are classes of organic compounds that form acid-resistant polymers, but a hydrophobic character often complements their acid resistance. Acid resistant polymers generally do not have a strong bonding affinity for the polar-protic constituents of a concentrated sulfuric acid solution, which keeps the polymers from dissolving in the acid. However, the hydrophobic character of the polymers also reduce the wettability and wickability of the mat in the battery acid, which can have several adverse consequences on battery performance. For example a battery separator with reduced wettability and wickability hinders the migration of sulfate ions between electrodes, which reduces the charging and discharging efficiency of the battery. This disadvantage is acutely felt in lead-acid batteries used in gas-electric hybrid vehicles that shut off a gasoline-powered internal combustion engine much more frequently than a conventional, gasoline-only vehicle.

There is a need for improved glass fiber mats in lead-acid batteries that resolve the tradeoff between binders with good acid resistance and binders that impart good wettability and wickability characteristics to the mat. These and other issues are addressed in the present application.

BRIEF SUMMARY OF THE INVENTION

Glass-fiber mats are described with improved wettability characteristics that make the mats more suitable as separators and reinforcement mats in lead-acid batteries. The improved wettability is achieved by introducing a hydrophilic agent to mat either by adding it to the binder composition that holds together the mats glass fibers, applying it to the cured binder-fiber composite, or both.

The improved wettability of the mat allows it to more rapidly absorb water from the surrounding battery components. When the mat is used as a reinforcement mat (sometime referred to as paper) surrounding a battery electrode, it can soak up water more rapidly from the wet paste that is used to make the electrode. This results in a faster and more uniform drying of the electrode paste resulting in a tougher and more electrically conductive electrode. Similarly, when the mat is used as a separator, it soaks up the sulfate ion-containing electrolyte (e.g., aqueous sulfuric acid) more rapidly and with more water-holding capacity. This improves the conductance of the sulfate ions between the anode and cathode electrodes, which allows electric current to flow more freely (i.e., with lower electrical resistance) when the battery is charged and discharged.

The hydrophilic agent may also improve the wickability of the glass-fiber mat as well as its wettability. Wickability refers to the ability of a material to disperse water, and in fiber mats is typically sensitive to the capillary action of water moving though channels formed between adjacent fibers. The wettability of the mat influences its wickability by making the water more attracted to the surface of the binder-coated fibers as it wicks its way through the mat.

Examples of glass-fiber mats for lead-acid batteries include mats made from a plurality of glass fibers held together by a binder. The binder may be made from a binder composition that includes (i) an acid resistant polymer, and (ii) a hydrophilic agent. The hydrophilic agent increases the wettability of the glass-fiber mat such that the glass-fiber mat forms a contact angle with water or aqueous sulfuric acid solution of 70° or less.

Further described are lead-acid batteries that include the glass fiber-mats. The batteries may include a positive electrode, a negative electrode, and the glass-fiber mat disposed adjacent to at least one of the positive electrode and the negative electrode. The mat may be a nonwoven glass-fiber mat that is made from a plurality of glass fibers and a binder holding together the fibers. The binder may be made from a binder composition that includes (i) an acid resistant polymer, and (i) a hydrophilic agent. The hydrophilic agent increases wettability of the glass-fiber mat such that the glass-fiber mat forms a contact angle with water or aqueous sulfuric acid solution of 70° or less.

Still further described are methods of making glass-fiber mats for lead-acid batteries. The methods may include providing a plurality of glass fibers, and applying a binder composition to the glass fibers. The binder composition may include an acid resistant polymer. The binder composition may be cured to form the glass-fiber mat. The method also includes placing a hydrophilic agent in the glass-fiber mat. The hydrophilic agent may be added to the binder composition, applied to the glass-fiber mat, or both. The hydrophilic agent increases wettability of the glass-fiber mat such that the glass-fiber mat forms a contact angle with water or aqueous sulfuric acid solution of 70° or less.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Examples of lead-acid batteries that include the present glass-fiber mats will now be described. Also described are methods of making the mats. As noted above, the glass-fiber mats include a hydrophilic agent that improves the wettability of the mat in the aqueous acidic environment of the lead-acid battery. The agent may be chosen from a hydrophilic gel and a hydrophilic carboxyl-containing compound, among other hydrophilic agents.

The glass-fiber mats may be used for a variety of components in both flooded lead-acid batteries, and valve regulated lead-acid (VRLA) batteries including absorbent glass mat (AGM) lead-acid batteries. For example, in flooded lead-acid batteries, the glass-fiber mats may be used as pasting paper in the electrode assemblies, as well as separator support mats for the battery separator. In VRLA batteries, the glass-fiber mats may be used a pasting papers for electrode assemblies, and as the separator or separator support.

Figure 1:
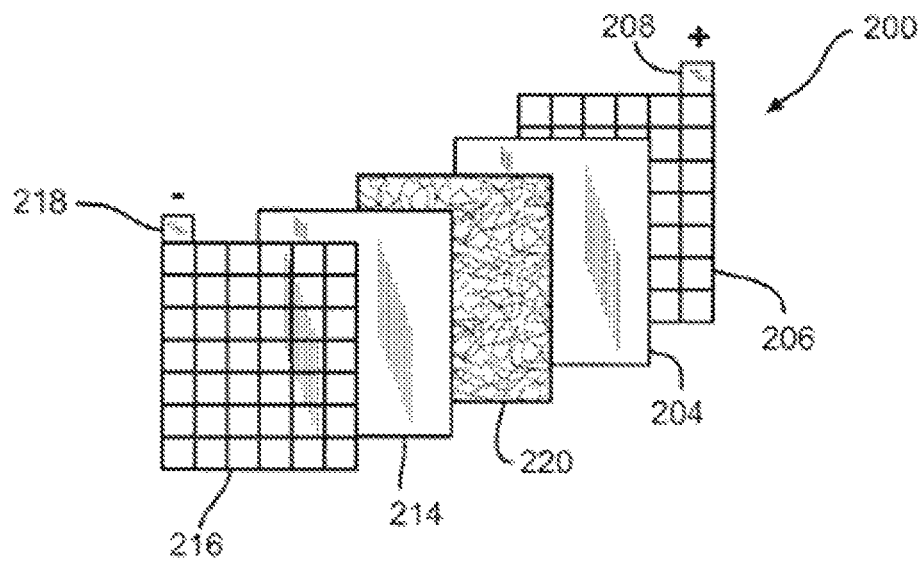
FIG. 1 illustrates an exploded perspective view of a battery cell assembly.
Figure 2:
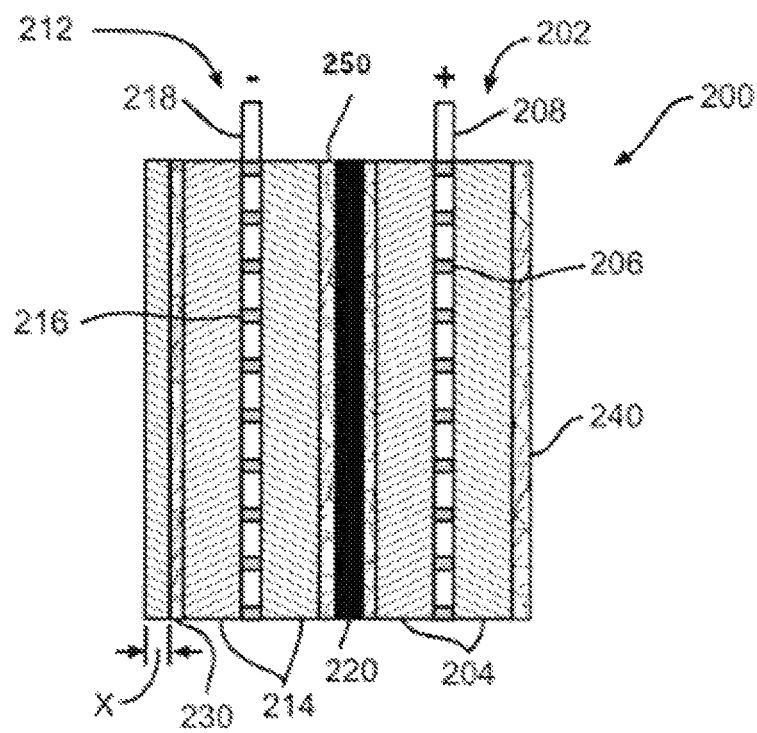
FIG. 2 illustrates an assembled cross section view of the battery cell assembly of FIG. 1.

Referring now to FIGS. 1 and 2, an exploded view of a lead-acid battery cell 200, and a cross-section assembled view 200 are shown. The lead-acid batter cell 200 may represent a cell used in either flooded lead-acid batteries or Absorptive Glass Mat (AGM) batteries. Each cell 200 may provide an electromotive force (emf) of about 2.1 volts and a lead-acid battery may include three such cells 200 connected in series to provide an emf of about 6.3 volts or may include six such cells 200 connected in series to provide an emf of about 12.6 volts, and the like. Cell 200 may include a positive plate electrode assembly 202 and a negative electrode assembly 212 separated by battery separator 220 so as to electrically insulate the electrode assemblies 202 and 212. Positive electrode assembly 202 may include a grid or conductor 206 of lead alloy material. A positive active material 204, such as lead dioxide, may typically be coated or pasted on grid 206. Grid 206 may also be electrically coupled with a positive terminal 208. Grid 206 may provide structural support for the positive active material 204 along with electrical conductivity to terminal 208.

Likewise, the negative electrode assembly 212 may include a grid or conductor 216 of lead alloy material that is coated or pasted with a negative active material 214, such as lead. Grid 216 may be electrically coupled with a negative terminal 218. Like grid 206, grid 216 structurally may support the negative active material 214 along with providing electrical conductance to terminal 218. In flooded type lead-acid batteries, the electrode assembiles 202 and 212 may be immersed in an electrolyte (not shown) that may include a sulfuric acid and water solution. In AGM type lead-acid batteries, the electrolyte may be absorbed and maintained within battery separator 220. Battery separator 220 may be positioned between the positive and negative electrode assemblies 202 and 212 to physically separate the two assemblies while enabling ionic transport, thus completing a circuit and allowing an electronic current to flow between positive terminal 208 and negative terminal 218.

The separator 220 may be made from the present glass-fiber mats. The thickness of mat is adequate to prevent positive and negative electrode assemblies 202 and 212 from making electrical contact that would short out the cell 200. Exemplary mat thickness ranges between 0.1 mm to 1.0 mm when compressed under a pressure of 10 kPa. The area weight of the glass mat in the separator 220 generally ranges from 100 and 400 g/m$^2$ (e.g., 150 and 300 g/m$^2$).

The glass mat used in separator 220 should be sufficiently electrically insulating to prevent significant electron conductance between the positive and negative electrode assemblies 202 and 212. Electrical resistivity on the order of about 1 MΩ per square or more is usually sufficient. While the separator 220 is electrically insulating, it should also be conductive to the ions in the electrolyte (e.g., $SO_4^{2-}$ ions) that form the complementary ionic current to the electric current traveling between the positive and negative electrode assemblies 202 and 212. The glass mat used in separator 220 is porous to permit this ionic migration, and can have a porosity of 50% to 90%. In exemplary separators 220, the average pore diameter of the ion channels formed in the separator 220 can range from 5 μm to 5 mm.

The nonwoven glass-fibers used in the separator 220 may include one or more of T-glass, 253-glass, and C-glass, among other types of glass fibers. The glass fibers used in the separator 220 may be grouped into two or more categories of fiber diameters. For example, the glass fibers may be divided into (i) coarse glass fibers having first category of nominal cross-sectional diameters of greater than 5 μm, and (ii) glass microfibers having a second category of nominal cross-sectional diameters of 0.1 to 5 μm. Exemplary weight ratios of the coarse glass fibers and glass microfibers have the coarse glass fibers making up 50 wt. % to 90 wt. % of a total weight of the plurality of glass fibers, and the glass microfibers making up 10 wt. % to 50 wt. % of a total weight of the plurality of glass fibers.

Exemplary coarse glass fibers may have lengths ranging from 0.3 inches to 1.5 inches. For example, the coarse glass fibers may have an average length of 1.25 inches, while in other examples shorter coarse glass fibers having lengths of 0.5 inches to 0.75 inches are used in the glass mat. The glass microfibers may have the same or different lengths than the coarse glass fibers. In some examples, the coarse glass fibers may be sized with a sizing composition to reduce the friction between fibers and/or increase bonding affinity between the fibers and the binder composition.

The weight ratio of coarse glass fibers to glass microfibers, as well as the physical dimensions of the fibers (e.g., average fiber diameter, fiber length, etc.) play a role in determining the overall tensile strength of the glass-fiber mat used in the separator 220. The total tensile strength of the separator 220 may range from 50 lbs/3-inch or more (e.g., 60 lbs/3-inch or more). The tensile strength of separator 220 in the machine direction of 30 lbs/3-inch or more and a tensile strength in the cross-machine direction of 15 lbs/3-inch or more.

The coarse glass fibers and glass microfibers may be homogeneously dispersed throughout the glass-fiber mat used in the separator 220. The homogeneous dispersion of the different size fibers is an alternative to a layered construction where the glass-fiber mat in made from two or more layers (e.g., a dual-layer construction) each having uniform-size fibers that only differ in size between the layers. Making the glass-fiber mat as a homogeneous layer of different-size fibers requires adjusting the manufacturing parameters used to make the mat compared with the parameters used to make a mat of uniform-size fibers. In many instances, the added manufacturing complexity of making a mat of homogeneously-dispersed different-size fibers produces a glass-fiber mat with improved performance characteristics, such as a more uniform electrical resistance across the mat, as well as more uniform utilization of active materials in the mat. It should be noted that glass-fiber mats made with homogenously dispersed coarse glass fibers and glass microfibers may be used in any of the described battery components that use glass-fiber mats, and are not limited to the separator 220.

In some examples, the glass-fiber mats may be blended with non-glass fibers, such as fibers made from organic polymers and fibers made from graphite, among others. Exemplary organic polymer fibers may include polyolefin fibers and polyester fibers, among others. Specific examples include polyethylene terephthalate (PET) fibers, polybutylene terephthalate (PBT) fibers, polyethylene (PE) fibers, polypropylene (PP) fibers, and poly(p-phenylene sulfide) (PPS) fibers, among others. Fibers made from these materials have comparable electrical conductivity to glass fibers.

As noted above, separator 220 electrically isolates the positive and negative electrode assemblies 202 and 212. In some instances however, it may be appropriate to lower the electrical resistivity by blending one or more types of electrically conductive fibers in the separator 220. Graphite fibers, for example, normally have a higher electrical conductivity (lower electrical resistance) than more electrically insulating glass and organic polymer fibers. Thus, adding graphite fibers to the glass-fiber mat makes separator 220 more electrically conductive. In addition to (or in lieu of) the graphite fiber, other fibers with increased electrical conductivity may be added to the glass-fiber mat. These conductive fibers may include conductive organic polymers (e.g., polyanilines), graphene, carbon nanofibers, carbon nanotubes, and carbon nanostructures (CNS), among others. Fibers made from graphene and/or CNS are relatively unreactive with sulfuric acid, and thus may increase the useful life of separator 220 in the acidic environment of the lead-acid battery cell 200.

The binder that holds together the glass fibers is an acid resistant binder. Exemplary acid resistant binders may include a substituted or unsubstituted acrylic acid or a substituted or unsubstituted acrylic ester. For example, the substituted or unsubstituted acrylic ester may include one or more of methyl methacrylate and ethyl acrylate, among other alkyl alkylacrylates and alkyl acrylates (e.g., a combination of methyl methacrylate and ethyl acrylate). The binder composition may further include acrylamide compounds such as methyl acrylamide. Examples of the substituted or unsubstituted acrylic ester further include at least two substituted or unsubstituted acrylic esters, where the esters form an acrylic ester copolymer. Some of these binder compositions are commercially sold under the tradename Rhoplex® by Dow Chemical Company (e.g., Rhoplex® HA-16), and Hycar® by Lubrizol Corporation (e.g., Hycar® 26-0688). Exemplary glass-fiber mats may include 5 wt. % to 30 wt. % of binder and 70 wt. % to 95 wt. % of glass fibers.

The separator 220 also includes at least one hydrophilic agent that may be (i) mixed into the binder composition before curing, (ii) applied to the uncured or cured glass-fiber mat, or both. For example, the hydrophilic agent may be added at 1-5 wt. % of the total binder composition that is applied to the glass fibers and cured to form the glass mat. Alternatively (or in addition) the binder composition may first be applied to the glass fibers and cured to form the glass mat, and then the hydrophilic agent is applied to the surface of the mat.

Exemplary hydrophilic agents may include (i) a hydrophilic gel and/or (ii) a hydrophilic carboxyl-containing compound. Exemplary hydrophilic gels may be made from a hydrophilic polymer chosen from polyacrylamide, polyacrylic acid, and polyvinyl alcohol, among other hydrophilic polymers. For example, the hydrophilic gel may be made from a hydrophilic polymer that is a polymerization product of N,N'-Methylenebis-acrylamide (which may act as a cross-linking agent) and acrylamide (which is a monomer). The formulation for the hydrophilic polymer may also include a polymerization catalyst such as ammonium persulfate $((NH_4)_2S_2O_8)$.

In addition to (or in lieu of) the hydrophilic gels, the hydrophilic agent may include a hydrophilic carboxyl-containing compound. These compounds may include a hydrophilic glycol ester, such as a polyethylene glycol ester. The polyethylene glycol ester may have a molecular weight of 1000 Daltons or less. Exemplary polyethylene glycol esters are available commercially under the tradename TegMeR® 812 by the HallStar Company.

Still more examples of hydrophilic agents used in the present glass-fiber mats may include ionic and nonionic surfactants. Exemplary ionic surfactants may include nitrogen-containing cationic surfactants, such as quaternary ammonium compounds (e.g., salts that include halogen anions coupled with a quaternary ammonium cation). One example of a quaternary ammonium compound that may act as a hydrophilic agent is stearyl dimethyl benzyl ammonium chloride, which is a component of a commercial surfactant formulation tradenamed Carsoquat® SDQ-25 sold by Lonza, Inc. Exemplary non-ionic surfactants include alcohol ethoxylates. One example of alcohol ethoxylates are tridecyl alcohol ethoxylates, which are sold commercially under the tradename Surfonic® TDA (e.g., Surfonic® TDA-8) by Huntsman Corp.

FIG. 2 also shows optional separator support mats 250 positioned on opposite sides of the separator 220. Exemplary separator support mats 250 may include a fine-fiber polymeric mat. The polymeric mat may include micro-sized voids that allow ionic transport (i.e., transport of ionic charge carriers) across separator 220. In some examples, the polymeric mat may have a thickness of 50 micrometers or less, including 25 micrometers or less, may have a porosity of about 50% or 40% or less, and may have an average pore size of 5 micrometers or less, including 1 μm or less. The polymeric mat may be made from one or more types of organic polymers such as PET, PBT, PP, PE, PPS, among other organic polymers. The polymeric mat may be made using manufacturing methods such as meltblown, meltspun, solution spun, spunbond, and spunlace, among others.

Exemplary separator support mats 250 may also include glass-fiber mats. The glass-fiber separator support mats 250 may be made from a single category of glass fibers, or made from two or more categories of glass fibers (e.g., coarse glass fibers and glass microfibers). Additional examples of separator support mats 250 include blends of glass fibers and polymer fibers, such as the organic polymer fibers described above for the polymeric mat.

Separator support mats 250 made from glass-fibers and/or polymer fibers with low electrical conductivity may include a conductive material and/or layer to enable electron flow on a surface and/or through separator support mat 250 to positive terminal 208 and/or negative terminal 218. For example, the fiber mat or mats of separator support mat 250 may include a conductive material and/or layer, such as within the binder of the mats, as a film, mat, or layer of conductive fibers, and/or in accordance with any example described herein. In such examples, electrons may flow along reinforcement mat 230, grid/conductor 216, reinforcement mat 240, grid/conductor 206, separator 220, and/or separator support mat 250 depending on which conductive path provides the least electrical resistance. For example, electrons proximate to grid/conductor 216 may flow along grid/conductor 216 and/or reinforcement mat 230 to terminal 218 while electrons proximate to separator 220 flow along an electrical path of separator 220 to terminal 218. Similarly, electrons proximate to grid/conductor 206 may flow along grid/conductor 206 and/or reinforcement mat 240 to terminal 208 while electrons proximate to separator 220 flow along an electrical path of separator 220 to terminal 208. In such examples, the available or possible electron paths may be greatly increased. In examples where the separator includes conductive materials, there may be a nonconductive layer and/or other nonwoven nonconductive mat positioned against the conductive portion of the separator. In examples not utilizing another nonwoven nonconductive mat, the conductive material in the separator may be positioned on or near a surface of the separator such that at least one nonconductive layer extends through a center of the separator.

The separator support mat 250 may also optionally include a hydrophilic agent and/or some other type of wetting component. For example, separator support mat 250 may include 10-40% of cotton fibers, such as cotton microfibers having diameters of between about 0.5 and 3.0 µm. In additional examples, the reinforcement mat may include a hydrophilic agent in the binder and/or on the mat like those described above for the separator 220. The wetting component may increase the wettability/wickability of the separator support mat 250 such that the separator support mat 250 has or exhibits an average water wick height and/or water/acid solution wick height of at least 1.0 cm after exposure to the respective solution for 10 minutes in accordance with a test conducted according to method ISO8787.

FIG. 2 further shows additional reinforcement mats that may optionally be incorporated into cell 200. For example, reinforcement mat 230 is positioned near a surface of negative electrode assembly 212, and reinforcement mat 240 is positioned near the surface of positive electrode assembly 202. The reinforcement mat 230 may be a nonwoven fiber mat disposed partially or fully over the surface of negative electrode assembly 212 so as to partially or fully cover the surface. The reinforcement mat 230 may be disposed on both surfaces of the negative electrode assembly 212, or may fully envelope or surround the electrode. Likewise, although reinforcement mat 230 is shown on the outer surface of the electrode assembly 212, in some examples, reinforcement mat 230 may be positioned on the inner surface of the electrode assembly 212 (i.e., adjacent to separator 220). Reinforcement mat 230 may reinforce the negative electrode assembly 212 by providing additional support for the negative active material 214. The additional support provided by reinforcement mat 230 may help reduce the negative effects of shedding of the negative active material particles as the active material layer softens from repeated charge and discharge cycles. This may reduce the degradation commonly experienced by repeated usage of lead-acid batteries.

Reinforcement mat 230 may often be impregnated or saturated with the negative active material 214 so that the reinforcement mat 230 is partially or fully disposed within the active material 214 layer. Impregnation or saturation of the active material within the reinforcement mat means that the active material penetrates at least partially into the mat. For example, reinforcement mat 230 may be fully impregnated with the negative active material 214 so that reinforcement mat 230 is fully buried within the negative active material 214 (i.e., fully buried within the lead paste). Fully burying the reinforcement mat 230 within the negative active material 214 means that the mat is entirely disposed within the negative active material 214. In examples, reinforcement mat 230 may be disposed within the negative active material 214 up to about a depth "X" of about 20 mils (i.e., 0.020 inches) from an outer surface of the electrode 212. In other examples, the glass mat 230 may rest atop the negative active material 214 so that the mat is impregnated with very little active material. Often the reinforcement mat 230 may be impregnated with the negative active material 214 so that the outer surface of the mat forms or is substantially adjacent the outer surface of the electrode assembly 212. In other words, the active material may fully penetrate through the reinforcement mat 230 so that the outer surface of the electrode assembly 212 is a blend or mesh of active material and reinforcement mat fibers.

Similarly, reinforcement mat 240 is shown positioned near a surface of positive electrode assembly 202 may be arranged and/or coupled with the positive assembly 202 similar to the arrangement and coupling of reinforcement mat 230 with respect to negative electrode assembly 212. For example, reinforcement mat 240 may be disposed partially or fully over the surface of positive electrode assembly 202 so as to partially or fully cover the surface, may be positioned on an inner surface of the electrode assembly 202 (i.e., adjacent separator 220) instead of the shown outer surface configuration, and/or may be impregnated or saturated with the positive active material 204 so that the reinforcement mat 240 is partially or fully disposed within the active material 204 layer. Like reinforcement mat 230, reinforcement mat 240 may provide additional support to help reduce the negative effects of shedding of the positive active material particles due to repeated charge and discharge cycles.

Reinforcement mats 230 and 240 may be a nonwoven glass-fiber mats whose thickness is a function of mat weight, binder content (Loss on Ignition [LOI]), and fiber diameter, among other parameters, similar to the other glass fiber mats described. The type of binder used and the length of the fibers may be weaker factors in determining the glass mat thickness. Higher binder content, however, may generally reduce the glass mat thickness, although excessive binder use may pose various processing challenges during mat production and thereafter. A lower mat weight may also reduce the mat thickness. The mat weight, however, may also be limited because the mat provides tensile strength during winding and downstream processes.

As described herein, reinforcement mats 230 and 240 may include a plurality of glass fibers and an acid resistant binder that couples the plurality of glass fibers together to form the reinforcement mat. Reinforcement mats 230 and 240 may have an area weight of between about 10 and 100 g/m$^2$, including between about 20 and 60 g/m$^2$. Reinforcement mats 230 and 240 may include a mixture of glass fibers that may include a combination of glass microfibers having a nominal cross-sectional diameter ranging between 0.1 to 5 µm and coarse glass fibers having a diameter greater than 5

µm. In some examples the glass fibers may make up between about 70-95% of the weight of the reinforcement mats 230 and 240. In additional examples, the reinforcement mats 230 and 240 may also include 5-30% conductive fibers. For example, conductive fibers having diameters about 6 µm and above and having lengths between about 8 and 10 mm can be included in the mats.

The reinforcement mats 230 and 240 also include an acid resistant binder that bonds the plurality of glass fibers together. The reinforcement mats 230 and 240 may further include a wetting component that is applied to reinforcement mats and/or the acid-resistant binder composition to increase the wettability/wickability of the reinforcement mats 230 and 240. The wettability/wickability of the reinforcement mats 230 and 240 may be increased such that the reinforcement mats have or exhibit an average water wick height and/or water/acid solution wick height of at least 1.0 cm after exposure to the respective solution for 10 minutes in accordance with a test conducted according to method ISO8787.

The reinforcement mats 230 and 240, as well as separator 220, may have a total tensile strength of, for example, 1 lbf/in or more, 5 lbf/in or more, 10 lbf/in or more, 15 lbf/in or more, 20 lbf/in or more, or 25 lbf/in or more, among other ranges of total tensile strengths. Additional exemplary total tensile strength ranges may be 1 lbf/in to 50 lbf/in. The tensile strengths of the present glass-fiber mats may be several times larger than those of conventional nonwoven fiber mats. For example, conventional pasting papers for AGM batteries typically have a base weight of 0.72 lb/sq and a tensile strength of 2.0 lbf/in (i.e., 6.0 lbf/3 inch). In contrast, a 1 inch wide sample of the present glass-fiber mats used in the reinforcement mats and separators, may have an exemplary total tensile strength normalized by weight greater of 1.0 sq/in or more, 2.0 sq/in or more, 7.0 sq/in or more, 14.0 sq/in or more, 21.0 sq/in or more, or 28.0 sq/in or more, among other ranges of total tensile strengths. A 3 inch wide sample of the present glass-fiber mats may have an exemplary total tensile strength normalized by weight of 50 sq/3 in or more, 60 sq/3 in or more, 80 sq/3 in or more, 100 sq/3 in or more, among other ranges of total tensile strengths. Additional exemplary normalized total tensile strength ranges may be 50 sq/3 to 150 sq/3 in.

Figure 3A:
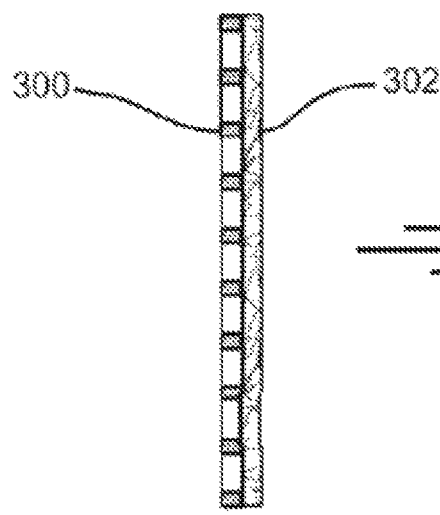
FIGS. 3A-3C illustrate cross section views of various configurations of an electrode or plate and a nonwoven fiber mat.
Figure 3B:
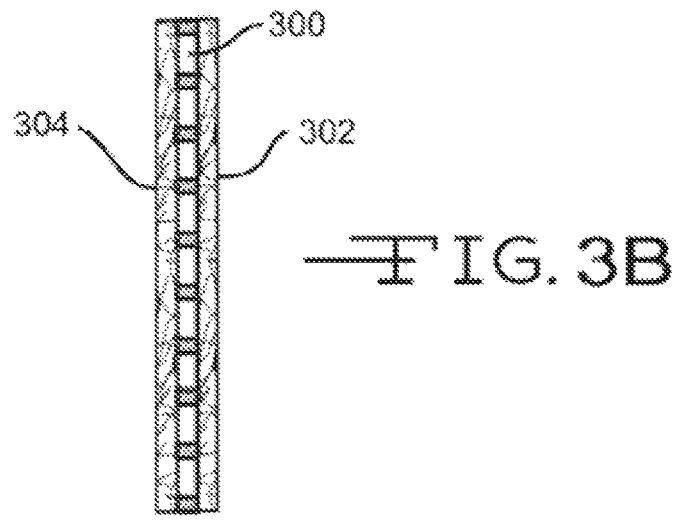
Figure 3C:
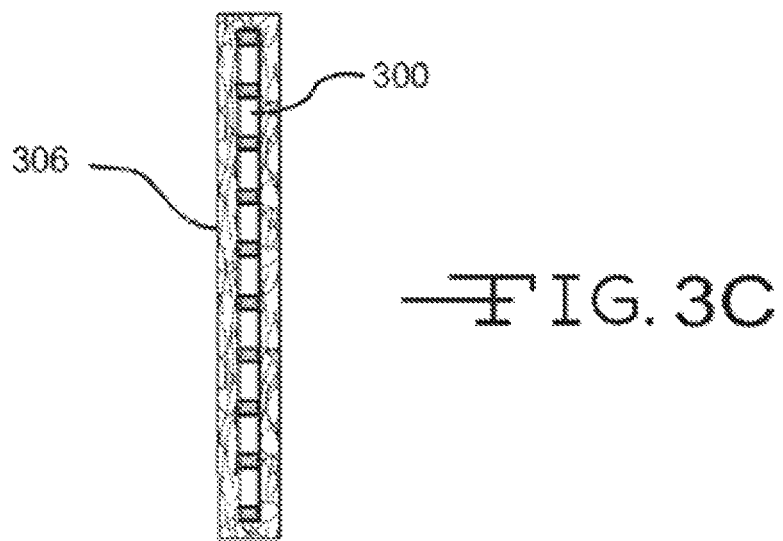

Referring now to FIGS. 3A-3C, illustrated are various electrode-pasting paper configurations. It should be noted that the terms "pasting paper" and "reinforcement mat" are used interchangeably in the art, and the pasting papers 302 and 304 described below may also be referred to as reinforcement mats. Conversely, the reinforcement mats 230 and 240 described in FIG. 2 may also be referred to as pasting paper. FIG. 3A illustrates a configuration where an electrode 300 has a single glass-mat pasting paper 302 disposed on or near an outer surface. The pasting paper 302 may include a conductive material and/or layer so as to enable electron flow on a surface and/or through the pasting paper 302 to a battery terminal. The pasting paper 302 may also include a wetting component (e.g., a hydrophilic agent) as described above to provide the pasting paper 302 with enhanced wettability characteristics. The pasting paper 302 may partially or fully cover the outer surface of electrode 300.

The configuration of FIG. 3B is similar to that of FIG. 3A except that an additional pasting paper 304 may be disposed on or near an opposite surface of electrode 300 so that electrode 300 may be sandwiched between the two pasting papers, 302 and 304. Either or both pasting papers, 302 and 304, may include a conductive material and/or layer to enable electron flow to a battery terminal as well as a wetting component. As such, electrode 300 may be sandwiched between two conductive pasting papers 302 and 304.

FIG. 3C illustrates a configuration where a pasting paper 306 may envelop or surround electrode 300. Although FIG. 3C illustrates the pasting paper 306 fully enveloping the electrode 300, in many examples a top side or portion of the pasting paper 306, or a portion thereof, is open. The pasting paper 306 may include a conductive material and/or layer as described above to enable electron flow as well as a wetting component.

Figure 4:
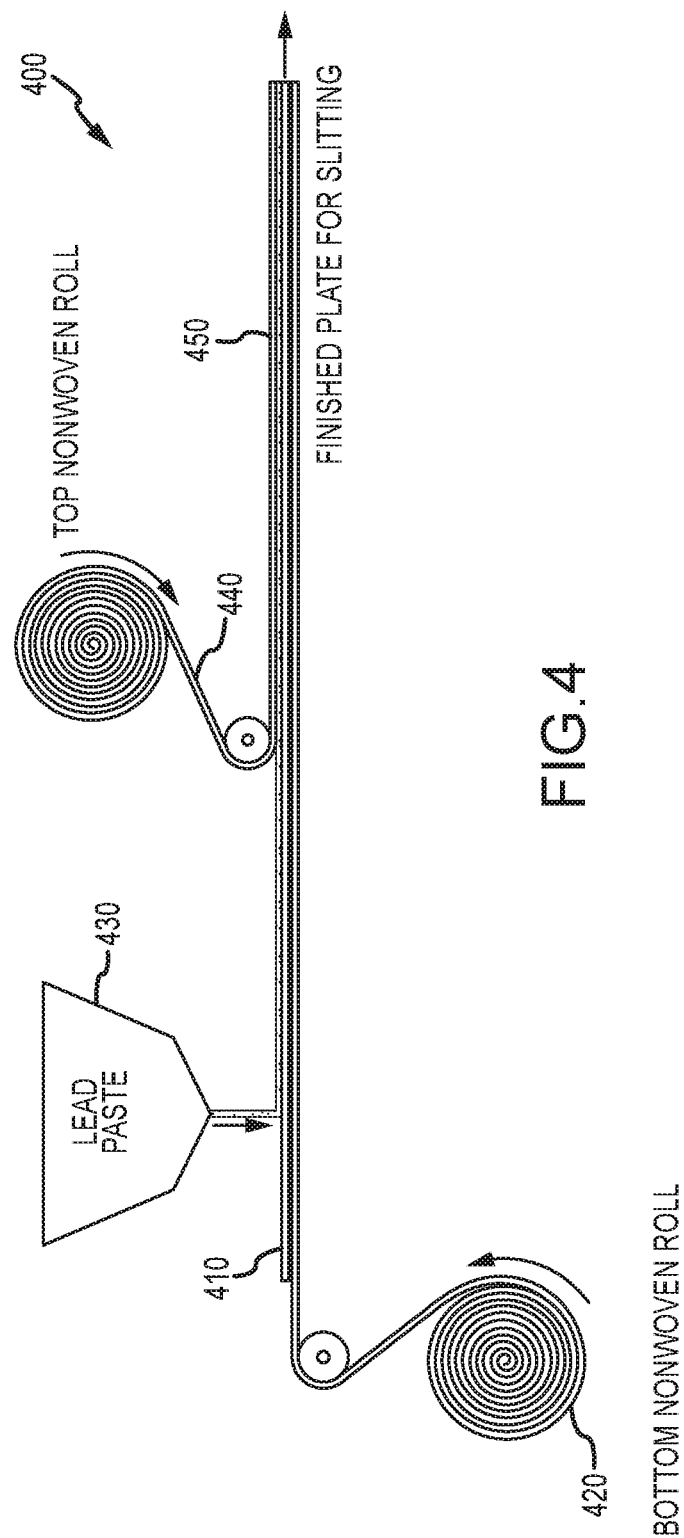
FIG. 4 shows as simplified schematic of a manufacturing system for making an electrode assembly.

FIG. 4 shows as simplified schematic of a manufacturing system 400 for making an electrode assembly with the present glass fiber mats as pasting paper. The system 400 includes a conveyor belt to transport a lead alloy grid 410 toward an active material 430 applicator (e.g., lead or lead oxide paste applicator). The applicator 430 applies or pastes the active material 430 to the grid 410. A first pasting paper roll 420 may be positioned below the grid 410 so that a first layer of pasting paper is applied to a bottom surface of the grid 410. The pasting paper may include a plurality of glass fibers, a binder, and at least one hydrophilic agent as described herein. A second pasting paper roll 440 may be positioned above grid 410 so that a second pasting paper is applied to a top surface of the grid 410. The second pasting paper may include a plurality of glass fibers, a binder, and at least one hydrophilic agent as described herein (similar to or different from first pasting paper formed by the first pasting paper roll 420).

The resulting electrode assembly 450 may subsequently be cut to length via a plate cutter (not shown). As described herein, the active material 430 may be applied to the grid 410 and/or top and bottom of the pasting papers formed from rolls 440 and 420, so that the active material impregnates or saturates the pasting papers to a desired degree. The electrode assembly 450 may then be dried via a dryer (not shown) or other component of system 400. As described herein, the pasting papers formed from rolls 440 and 420 may aid in the drying of the electrode assembly 450 by wicking the water and/or water/acid solution from the assembly 450 so as to allow the water and/or water/acid solution to evaporate.

The mixing, adding, and drying operations performed by manufacturing system 400 may be continuous processes instead of batch or semi-batch processes. When run as continuous processes, the manufacturing system 400 may be run continuously, for a faster throughput and more cost effective operation.

Figure 5:
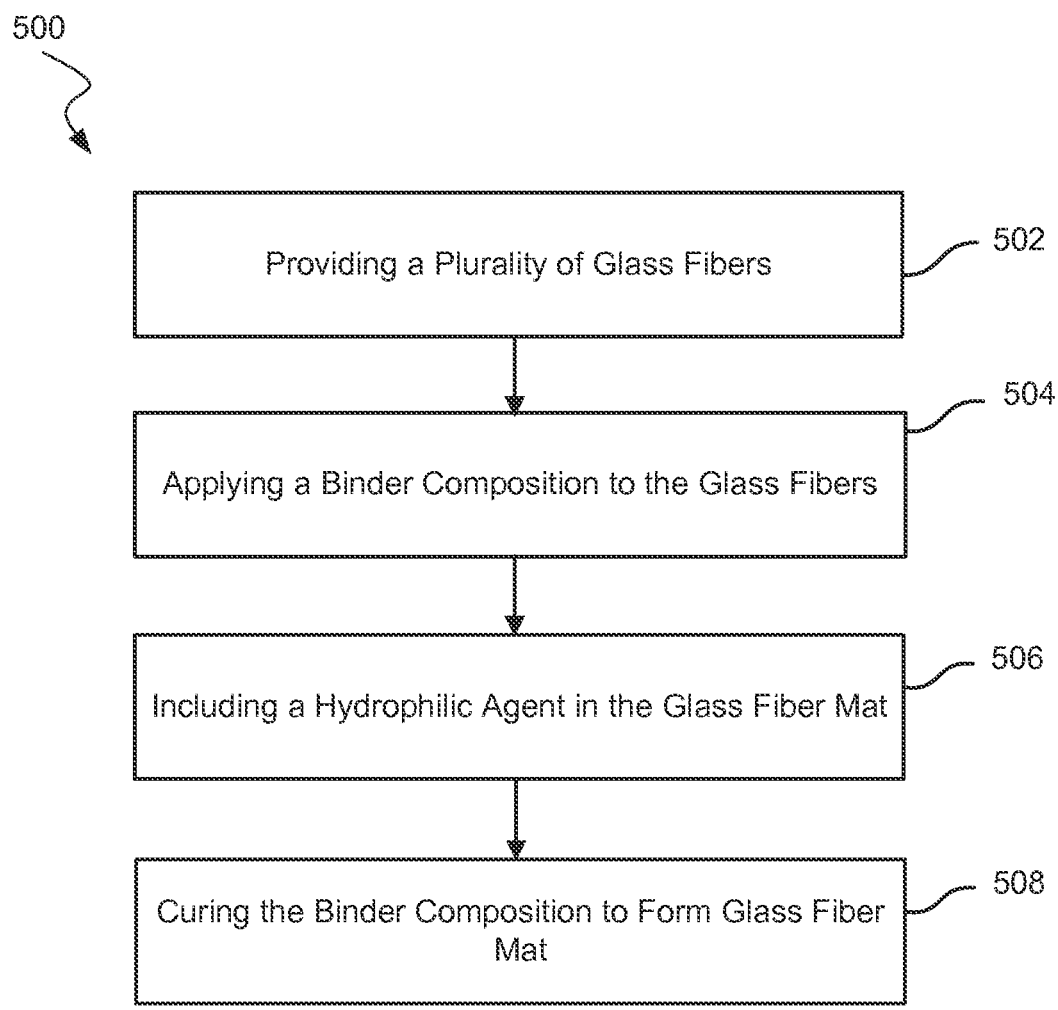
FIG. 5 shows a block diagram of a method of making a nonwoven fiber mat.

Referring now to FIG. 5, shows a flowchart highlighting selected steps in a method 500 of making a glass-fiber mat for a lead-acid battery. The method 500 may include providing a plurality of glass fibers 502. The plurality of fibers may include a single kind of glass fiber, or alternatively may include two or more types of glass fibers. For example, the plurality of glass fibers may include a first kind of coarse glass fibers that have nominal cross-sectional diameters greater than 5 µm, and a second kind of glass microfibers that have nominal cross-sectional diameters ranging from 0.1 µm to 5 µm. The two kinds of fibers may be blended in various weight ratios. For example, the glass microfibers may constitute 10 wt. % to 50 wt. % of the total weight of the plurality of glass fibers. Similarly, the coarse glass fibers may constitute 50 wt. % to 90 wt. % of the total weight of the plurality of glass fibers.

In some examples, the glass fibers may be sized. For example, the fibers may be contacted with a whitewater solution that includes a sizing composition that is applied to the exposed surfaces of the fibers. The sizing compositions may be applied to less than all the types of fibers included in the plurality of fibers. For example, in a blend of coarse glass fibers and glass microfibers, the sizing composition may only be applied to the coarse glass fibers.

In some examples, the plurality of glass fibers may also include a powdered filler. The powdered filler may increase wickability, which may be useful in mat formulations that use a low weight percentage (wt. %) of glass microfibers relative to the coarse glass fibers. The powdered filler may between about 0.1% and about 20% by weight of the nonwoven fiber mat. The coarse glass fibers and the microfibers together may help hold the powdered filler in the mixture or slurry or finished nonwoven fiber mat.

The method 500 also includes applying a binder composition to the glass fibers 504. As noted above, the binder composition may be a substituted or unsubstituted acrylic acid or a substituted or unsubstituted acrylic ester. For example, the substituted or unsubstituted acrylic ester may include one or more of methyl methacrylate and ethyl acrylate, among other alkyl alkylacrylates and alkyl acrylates (e.g., a combination of methyl methacrylate and ethyl acrylate). The binder composition may further include acrylamide compounds such as methyl acrylamide. Examples of the substituted or unsubstituted acrylic ester further include at least two substituted or unsubstituted acrylic esters, where the esters form an acrylic ester copolymer. Some of these binder compositions are commercially sold under the tradename Rhoplex® by Dow Chemical Company (e.g., Rhoplex® HA-16), and Hycar® by Lubrizol Corporation (e.g., Hycar® 26-0688). Exemplary glass-fiber mats may include 5 wt. % to 30 wt. % of binder and 70 wt. % to 95 wt. % of glass fibers.

The method 500 may also include including a hydrophilic agent in the glass fiber mat 506. The hydrophilic agent may be added to the binder composition, applied to the glass-fiber mat, or both. For example, the hydrophilic agent may be mixed with the other components of the binder composition (e.g., the substituted or unsubstituted acrylic acid or the substituted or unsubstituted acrylic ester) to form the final formulation of the binder composition. Alternatively, the hydrophilic agent may be applied onto the combination of the fibers and binder composition before and/or after the binder-fiber amalgam has been cured. Exemplary methods of applying the hydrophilic agent include dip coating, spray coating, and curtain coating, among other application techniques.

The method 500 may further include curing the binder composition to form the glass-fiber mat 508. Curing may involve exposing the binder-fiber amalgam to an elevated temperature environment, such as a curing oven, dryer, or other type of heating unit. As the oven raises the temperature of the binder-fiber amalgam to a curing temperature, the binder composition polymerizes into a binder matrix that holds together the plurality of fibers into the glass-fiber mat. As noted above, in some examples a hydrophilic agent may be applied to the glass-fiber mat during and/or following the curing of the binder. Alternatively (or in addition) the hydrophilic agent may already be present in the curing binder composition and remain active in the cured glass-fiber mat.

The glass-fiber mats produced by method 500 find use as lead-acid battery separators and reinforcement mats. The hydrophilic agent gives the mats improved hydrophilic properties, such as increasing the wettability and/or wickability of the mat. For example, the glass-fiber mats produced by method 500 may have improved wettability as measured by the contact angle between the mat and water or an aqueous sulfuric acid solution. The contact angle may be 70° or less, 50° or less, or even smaller threshold angles. The glass-fiber mats may also show increased wickability, as measured by the Klemm method (i.e., ISO8787, except that sulfuric acid with a specific gravity of 1.28 is used instead of water). The present mats may have an average sulfuric acid wick height of between 1 cm and 5 cm (e.g., 2 cm to 4 cm; 3 cm to 4 cm) after exposure to sulfuric acid (with a specific gravity of 1.28) for 10 minutes, as measured by the Klemm method.

EXAMPLES

The effects of surfactants on the wickability of non-woven glass fiber mats were measured. The non-woven glass mats were made with a wet-laid machine that brings together the binder composition with the glass fibers. The non-woven glass mat samples used a combination of coarse glass fibers, made from K249T glass and having a nominal fiber diameter of 13 μm and length of 0.75 inches, and glass microfibers, made from 206-253 glass and having a nominal fiber diameter of about 0.765 μm. The weight ratio of the coarse glass fibers to glass microfibers was 70:30 for all the samples measured.

The glass fibers were contacted with a variety of binder compositions listed in Table 1 below. All the binder compositions included Rhoplex® HA-16, and/or a surfactant such as Carsoquat® SDQ-25 or TegMeR® 812.

The air permeability of the non-woven glass mats was measured by the TEXTEST™ FX 3300 according to ASTM Standard Method D737. This test was normally carried out at a differential pressure of 125 Pa. The wickability (i.e., wicking strength) of the mats were measured according to ISO8787, with the wicking liquid being a 40 wt. % sulfuric acid solution.

TABLE 1

Air Permeability and Wickability of Glass Fiber Mats With Various Binder Compositions

| LOI (%) | Base wt. (lb/sq) | Binder | Air perm (cfm) | Wicking length @10 mins (cm) |
|---|---|---|---|---|
| 20.3 | 1.11 | Rhoplex ® HA-16 | 77 | 1.1 |
| 16.6 | 0.97 | Rhoplex ® HA-16 with added Carsoquat ® SDQ-25 (10% to the binder solids) | 106 | 2.6 |
| 22.6 | 1.18 | Rhoplex ® HA-16 with added Tegmer 812 (20% to the binder solids) | 64 | 1.3 |

The measurements of wickability in Table 1 show the addition of hydrophilic agents such as Carsoquat® SDQ-25 significantly increase the wickability of the tested non-woven glass fiber mats.

The preceding description provides exemplary examples, and is not intended to limit the scope, applicability or configuration of the disclosure. Rather, the preceding description provides those skilled in the art with an enabling description for implementing one or more these examples, as well as other examples that are not herein described. It is understood that various changes may be made in the function and arrangement of elements without departing from the spirit and scope of the invention as set forth in the appended claims.

Specific details are given in the preceding description to provide a thorough understanding of the examples of the invention. However, it would be understood by one of skill in the art that the examples may be practiced without these specific details. For example, processes, and other elements in the invention may be shown as components in block diagram form in order not to obscure the examples in unnecessary detail. In other instances, well-known processes, structures, and techniques may be shown without unnecessary detail in order to avoid obscuring the examples.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A glass-fiber mat for a lead-acid battery, the mat comprising:
    a plurality of glass fibers; and
    a binder that holds together the plurality of glass fibers in the mat,
    wherein the binder is made from a binder composition comprising:
        an acid resistant polymer; and
        a hydrophilic agent comprising a hydrophilic polymer made from acrylamide that is crosslinked with N,N'-methylenebis(acrylamide);
    wherein the hydrophilic agent increases wettability of the glass-fiber mat such that the glass-fiber mat forms a contact angle with water or aqueous sulfuric acid solution of 70° or less.

2. The glass fiber mat of claim 1, wherein the acid resistant polymer comprises a substituted or unsubstituted acrylic acid or a substituted or unsubstituted acrylic ester.

3. The glass fiber mat of claim 2, wherein the substituted or unsubstituted acrylic ester comprises a combination of methyl methacrylate and ethyl acrylate, and wherein the binder composition further comprises methyl acrylamide.

4. The glass fiber mat of claim 2, wherein the substituted or unsubstituted acrylic ester comprises at least two substituted or unsubstituted acrylic esters, and wherein the at least two substituted or unsubstituted acrylic esters form an acrylic ester copolymer.

5. The glass fiber mat of claim 1, wherein the plurality of glass fibers are made from glass chosen from T-glass, 253-glass, and C-glass.

6. The glass fiber mat of claim 1, wherein the plurality of glass fibers comprise coarse glass fibers having first nominal cross-sectional diameters of greater than 5 µm, and glass microfibers having second nominal cross-sectional diameters of 0.1 to 5 µm.

7. The glass fiber mat of claim 6, wherein the glass microfibers comprise 10 wt. % to 50 wt. % of a total weight of the plurality of glass fibers.

8. The glass fiber mat of claim 1, wherein the hydrophilic agent increases wettability of the glass-fiber mat such that the glass-fiber mat forms a contact angle with water or aqueous sulfuric acid solution of 50° or less.

9. The glass fiber mat of claim 1, wherein the hydrophilic agent increases wickability of the glass fiber mat such that the glass fiber mat has an average sulfuric acid wick height of between 1 cm and 5 cm after exposure to sulfuric acid having a specific gravity of 1.28 for 10 minutes as measured by the Klemm method.

10. The glass fiber mat of claim 1, wherein the glass fiber mat comprises a reinforcement mat or a separator for the lead-acid battery.

11. The glass fiber mat of claim 1, wherein the lead-acid battery is an absorptive glass mat (AGM) battery or a flooded lead-acid battery.

* * * * *